United States Patent [19]
Wanner et al.

[11] 3,984,192
[45] Oct. 5, 1976

[54] DRILL MOUNT

[75] Inventors: Karl Wanner, Echterdingen;
Reinhardt Hahner, Kemnat;
Wolfgang Schmid, Plattenhardt;
Manfred Bleicher, Leinfelden; Horst
Sigg, Stuttgart-Degerloch; Jörg
Fälchle, Bempflingen, all of
Germany

[73] Assignee: Robert Bosch G.m.b.H., Stuttgart,
Germany

[22] Filed: July 13, 1973

[21] Appl. No.: 379,109

[30] Foreign Application Priority Data
July 18, 1972   Germany............................ 2235109

[52] U.S. Cl.................................. 408/226; 85/46;
151/7; 279/1 Q; 279/7; 279/62; 279/100;
403/343; 408/239 R
[51] Int. Cl.².......................................... B23B 31/04
[58] Field of Search.............. 279/7, 19, 1 S, 19.3,
279/99, 100, 101, 62; 403/343, 342, 118,
320; 83/698; 408/239, 239 A, 226; 151/7, 25
R; 85/46

[56]         References Cited
UNITED STATES PATENTS

| 1,407,335 | 2/1922 | Reynolds et al. | 403/320 X |
| 1,465,612 | 8/1923 | Morse | 408/226 X |
| 1,532,329 | 4/1925 | McConnell | 279/62 |
| 1,943,879 | 1/1934 | Rea | 279/99 X |
| 2,112,108 | 3/1938 | Mackenzie | 403/343 X |
| 3,156,323 | 11/1964 | Boyer, Sr. | 403/118 X |

FOREIGN PATENTS OR APPLICATIONS

| 543,733 | 3/1942 | United Kingdom | 279/1 Q |

Primary Examiner—Othell M. Simpson
Assistant Examiner—Z. R. Bilinsky
Attorney, Agent, or Firm—Michael J. Striker

[57]           ABSTRACT

A rotary spindle of a drill mount has a free end provided with a thread whose angle of rise is so selected that its tangent is at least equal to the coefficient of static friction of steel on steel.

25 Claims, 12 Drawing Figures

DRILL MOUNT

BACKGROUND OF THE INVENTION

The present invention relates to a drill mount for connecting a drill bit to a drive unit.

Drill mounts are known in the art for connecting a drill bit to a drive unit so as to be able to transmit from the drive unit to the drill bit rotary as well as reciprocatory movements. Such drill mounts are constucted as auxiliary components capable of accommodating a single type of drill bit. Such components are then connected with the drive unit. The drill bit itself is frequently connected with the auxiliary component by means of threads, which has the disadvantage that since the threads are subjected to contamination with dirt, quite frequently and rapidly they will not properly operate. Moreover, frequently the material of the thread will become damaged due to material fatigue which leads to the formation of fractures in the material. Another problem is that if such auxiliary components are subjected to rotary as well as reciprocatory motions imparted to them by the drive unit, the threaded connection between the auxiliary component and the drill bit tends to become over-tightened and is then very difficult to release.

Summary of the Invention

It is an object of the present invention to avoid the disadvantages of the prior art.

More particularly it is an object of the invention to provide an improved drill mount for connecting a drill bit to a drive unit, particularly a drive unit which provides both rotary and reciprocating motion.

Another object of the invention is to provide such a drill mount wherein the drill bit can be reliably connected with the mount but can be readily released therefrom whenever desired.

Another object of the invention is to provide such an improved drill mount in which the possibility of contamination with dirt, and the possibility of premature destruction due to wear, are substantially reduced.

In keeping with these objects, and with others which will become apparent hereafter, one feature of the invention resides, in a drill mount for connecting a drill bit to a drive unit, in a combination comprising a rotary spindle having a free end portion, and a thread formed on this free end portion and having an angle of rise the tangent of which is at least equal to the coefficient of static friction of steel on steel.

So constructed, the drill mount according to the present invention permits a very simple disengagement from a component with which it has been connected by means of its thread.

It is advantageous if the thread is a round thread because this eliminates the existence of sharp curves on the thread, which have been found to facilitate the formation of fissures in the material when the latter is subjected to stresses. Moreover, this type of thread tends to discourage the accumulation of dirt and reduces the possibility that a use might injure himself by engagement with the thread.

According to a further concept of the invention a braking ring is provided adjacent the thread, that is a ring of elastic material having a high coefficient of friction with respect to steel. This ring provides for a frictional but threadedly releasable connection between the spindle and a component which is threadedly connected with the same. Such an arrangement has the advantage that in operating conditions in which no torque is transmitted to the spindle (e.g. if only reciprocatory motions are transmitted to it), so that the threadedly connected spindle and component might tend to become unthreadeed, the ring will prevent such a possibility.

The braking ring may be so arranged that it is fixedly connected either with the spindle or with the component which is to be threadedly connected with the same, and has frictional contact with the respective other element as a result of having a different diameter than this other element. The frictional engagement may be with respect to a portion of the respective thread or with respect to a cylindrical portion of the element in question. The braking ring is advantageously of such construction that it will transmit no torque greater than approximately 20 Nm, so that only a small force is required to unthread the connected components (the spindle and the auxiliary component) against the braking force of the ring.

The ring may also be sc arranged that it is effective only over the length of approximately 0.5–1.5 turns during the threading-together of the spindle and auxiliary component. This means that when these components are to be threaded together, the operator need overcome the braking effect of the ring only during the last 0.5–1.5 turns of spindle and auxiliary component relative to one another, so that the additional force required for overcoming this braking effect need be provided for only a brief period of time.

The thread on the spindle may be an internal thread and the braking ring may be lodged in an annular groove which is in interior or an exterior groove axially adjacent the thread. Such an arrangement has the advantage that components such as drill bits or the like having threads which can mesh with the interior thread, can be directly threaded into the spindle.

The component which can be threaded into the interior thread may be a drill bit having an appropriate thread which can mesh with that of the spindle and a shoulder which delimits the extent to which the components can be threaded together, or it may be a similarly configurated pin having a free end provided with a chuck for engagement of a drill bit. Evidently, such an arrangement makes it possible to connect any conventional drill bit with the drill mount according to the present invention.

The thread of the spindle may also be an exterior thread and the spindle may be provided with a coaxial limiting pin which prevent threading-together of the spindle and the auxiliary component beyond a certain extent. A coupling sleeve may be provided, having two identical internal threads one of which can mesh with the exterior thread of the spindle, and the braking ring may be fixedly lodged in an internal groove located between the two threads of the sleeve and in frictional engagement with the aforementioned shoulder on the spindle and a similar shoulder of the auxiliary component which is threaded into the other end of the sleeve. Another possibility is to thread a chuck onto the exterior thread of a rotary spindle, which chuck can accommodate any conventional drill bit, and the chuck having in its recess provided with the interior thread which mates with the exterior thread of the spindle, an inner circumferential groove in which the braking ring is lodged. This groove could also be an outer circumferential groove on the spindle itself adjacent the thread thereon. These arrangements have the advantage that it is alternatively possible to connect a threaded drill bit directly with the rotary spindle, or else to connect a chuck with the spindle so that the conventional non-threaded drill bits can be utilized.

The braking ring could also be constructed for mechanical engagement rather than for frictional engagement. In this case the braking ring may be a spring ring engaging into a circumferential groove. This would for instance make it possible to use for the ring a material which is less subject to wear than the friction-promoting material which has been discussed heretofore with respect to the braking ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
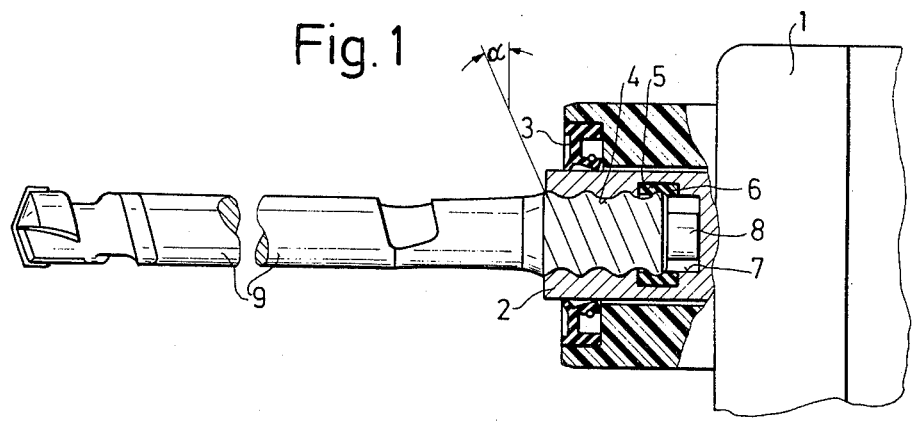
FIG. 1 is a fragmentary side view, partially sectioned, of a first embodiment of the invention.

Discussing the drawing now in detail, and referring firstly to the embodiment illustrated in FIG. 1, it will be seen that reference numeral 1 identifies diagrammatially and fragmentarily a housing of a drive unit capable of transmitting rotary as well as reciprocatory motions to the drill mount according to the present invention. Such drive units are well known from hammer drills and require no detailed discussion.

Reference numeral 2 identifies a spindle which is mounted in the housing 1 for transmitting the rotary and reciprocatory motions to a drill bit 9. The housing is sealed against the entry of contaminants by means of a seal 3.

As FIG. 1 shows, the spindle 2 is provided with an internal thread 4 adjacent the inner end of which there is provided an inner circumferential groove 5 in which a braking ring 6 is lodged. The thread 4 can be a conventional thread but preferably is a round thread or a type of thread in which all sharp edges are rounded off to reduce the tendency of contaminants to become lodged in the thread and also to reduce the tendency for the formation of fissures in the thread material at sharp edges.

The angle of rise of the thread 4 is identified with a and so selected that it is greater or at least equal to the coefficient of static friction of steel on steel. This assures that a component threaded into the thread 4 can readily be disengaged without requiring the use of significant force.

Adjacent the ring 5 the spindle 2 is provided with a blind bore 7 having a planar bottom wall which is engaged by a projection 8 of a drill bit 9, the projection 8 serving to delimit the extent to which the drill bit can be threaded into the thread 4. The projection 8 or the depth of the blind bore 7 on the one hand, and the position of the ring 6 on the other hand, are so coordinated that when the drill bit is completely threaded into the thread 4, approximately 0.5–1.5 turns of the thread 4 will be located within the braking ring 6. The reason for this has already been discussed earlier.

The braking ring 6 is of an elastic material having a high coefficient of friction with respect to steel, for instance a rubber having a high resistance to wear. The inner diameter of the ring 6 is smaller than the outer diameter of the exterior thread of the drill bit 9. This diameter differential assures a frictional engagement with the drill bit 9 which prevents the latter — which has no self-locking facility due to the high angle of rise of its thread and that of the thread 4 — from becoming loosened. Depending upon the geometric configuration of the ring 6, and of course the degree of elasticity thereof, a braking moment can be frictionally produced between the ring 6 and the drill bit 9 which amounts to between substantially 10 and 20 Nm and therefore can be readily overcome by a user who turns the drill bit 9 by hand. On the other hand, the braking force or mount is large enough to prevent loosening of the drill bit 9 in the thread 4, for instance when the drill bit 9 is rotating but is not in contact with a workpiece so that it is not subjected to torque by the drive unit 1. Although the cross-section of the ring 6 is shown to be rectangular in FIG. 1, it goes without saying that any other cross-section can be selected for it.

Figure 2:
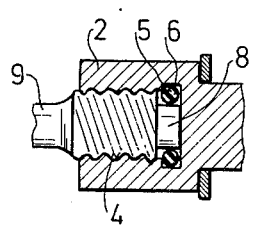
FIG. 2 is a fragmentary sectional detail view of a second embodiment of the invention.

The embodiment in FIG. 2 is quite reminiscent of that in FIG. 1, and all components which are not necessary for an understanding of the embodiment in FIG. 2 have been omitted for the ske of clarity. It will be appreciated that these components are the same as in FIG. 1. In FIG. 2, however, the frictional engagement between the ring 6 takes place not with the thread of the drill bit 9, but instead with the projection 8 of the same. It is evident that in this embodiment the inner diameter of the ring 6 must be smaller than in the embodiment of FIG. 1, and that it will be smaller than the outer diameter of the projection 8. This embodiment has the advantage that the wear of ring 6 is reduced because instead of engaging a thread it engages a smooth cylindrical surface, namely that of the projection 8. The effect and operation is the same as in FIG. 1. In FIG. 2 the blind bore 7 has been omitted, thus simplifying the construction.

Figure 3:
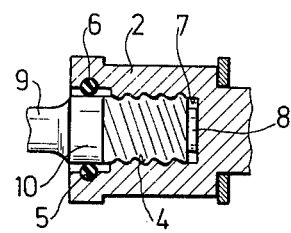
FIG. 3 is a view similar to FIG. 2 but illustrating a third embodiment of the invention.

The embodiment of FIG. 3 provides for the ring 6 to be located downwardly adjacent the thread 4, rather than inwardly adjacent thereof. The ring 6 here engages the outer circumferential surface of a cylindrical portion 10 of the drill bit 9. This cylindrical portion 10 may have a larger diameter than the outer diameter of the thread on the drill bit 9, or, to put this a different way, the thread of the drill bit 9 may have a smaller diameter than the outer diameter of the portion 10, to assure that the thread can pass through the ring 6 without contacting the same and subjecting the latter to wear.

Figure 4:
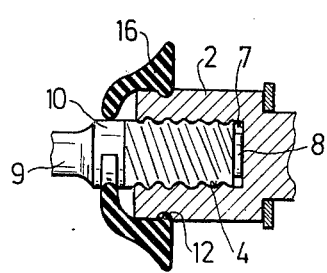
FIG. 4 is a view similar to FIG. 3, illustrating a fourth embodiment of the invention.

FIG. 4 shows an embodiment in which the drill bit 9 again has a cylindrical portion 10. In this embodiment the part of the drill bit 9 having the thread which meshes with the thread 4 is so long that the cylindrical portion 10 is located outside the spindle 2. This spindle is provided in its outer circumferential surface with an annular groove 12 in which the substantially cap-shaped ring 16 engages as illustrated, with the drill bit 9 extending through the center opening of the ring 12 so that the latter frictionally engages the portion 10 of the drill bit 9. The ring 16 in this embodiment may be entirely of elastic material having a high coefficient of friction with respect to steel, or it may be partly of any other material (synthetic plastic, metal or the like) having a braking ring secured in it for engagement with the portion 10. It is advantageously so configurated that it tends to fling off contaminants during rotation, and this arrangement as well as that in FIG. 3 afford an effective protection against contamination of the thread 4 of the spindle 2.

Figure 5:
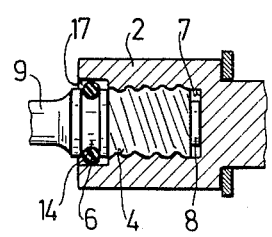
FIG. 5 is a view similar to FIG. 4, illustrating a fifth embodiment of the invention.

In the embodiment of FIG. 5 the ring 6 is provided on the drill bit 9 itself, being lodged in an outer circumferential groove 14 of the same which is located at the same place of the drill bit 9 wherein FIG. 3 the cylindrical portion 10 is provided. The hole in the spindle which is provided with the thread 4 is provided with a short enlarged recess 17 at the outer end of the thread 4, and the ring 6 frictionally engages the inner circumferential surface bounding this recess 17. Providing the ring 6 on the drill bit 9 has the advantage that the ring 6 can be readily exchanged for another one when rear or other damage so dictates, because it is easily accessible. It can also be readily visually inspected for wear. The thread 4 in this embodiment is also effectively protected against contamination, due to the presence of the ring 6.

Figure 6:
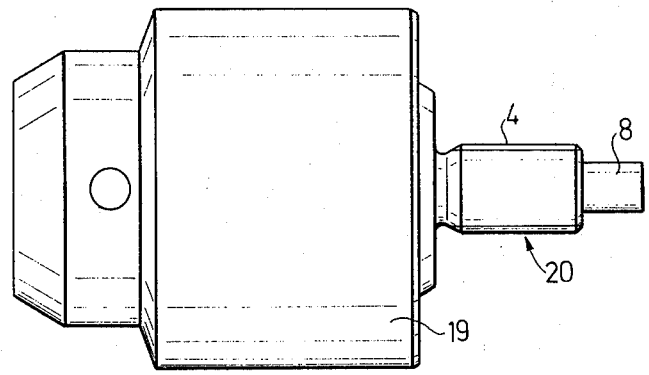
FIG. 6 is a side view illustrating a sixth embodiment of the invention.

In the embodiment of FIG. 6 a conventional chuck 19 is provided having a projection or pin 20 which can be threaded into the spindle 4 in the same manner as the drill bit 9 in FIG. 1, and which is also provided with a projection 8 corresponding to the projection 8 of FIG. 1. The braking ring 6 may engage the threads of the projection 20 as in FIG. 1, or it may engage the projection 8 as in FIG. 2. The spindle 2 and the housing of the drive unit 1 have been omitted in this Figure for the sake of clarity. It will be evident that any conventional drill bit can be engaged with the chuck 19 in conventional manner.

Figure 7:
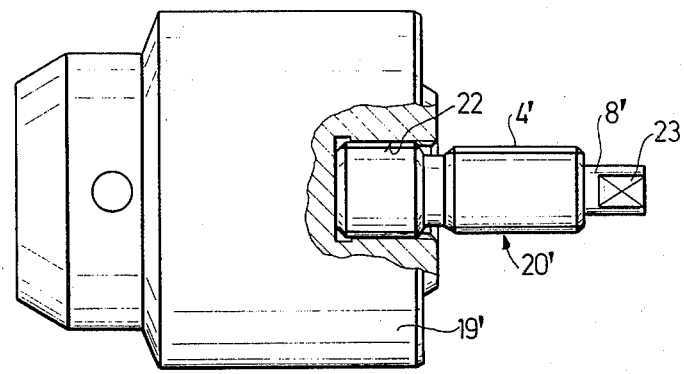
FIG. 7 is a side view, partly sectioned, of a seventh embodiment of the invention.

The embodiment of FIG. 7 is of a type utilizing a conventional commercially available chuck 19' having a tapped hole provided with an internal thread 22. A connecting pin 20' is threaded into the threads 22 and provided with an additional thread 20'' which is so configurated that it can mesh with the thread 4 of the spindle 2 which has not been illustrated. In addition, the pin 20' is provided with a projection 8' corresponding to the projection 8 in FIG. 1 which is provided with at least two engagement faces 23 for engagement by a wrench to facilitate threaded connection of the pin 20' with the chuck 19'. This arrangement has the advantage that any conventional chuck 19' can be connected with the drive unit by means of the pin 20'. The non-illustrated braking ring 6 may engage the projection 20' or the thread 20''.

Figure 8:
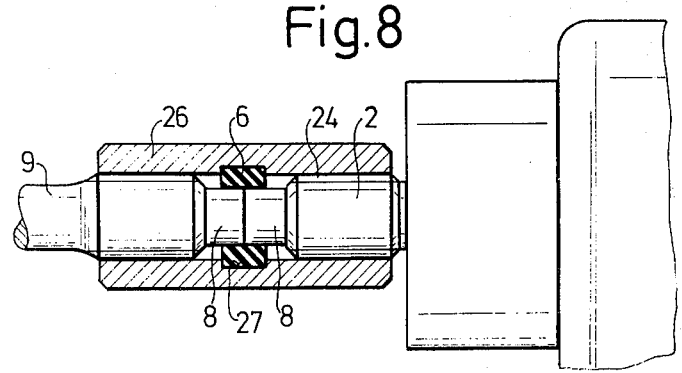
FIG. 8 is a side view, partly sectioned, of an eighth embodiment of the invention.

In the embodiment of FIG. 8 the spindle 2 may be provided with an external thread 24 in lieu of the internal thread 4 of the preceeding embodiment. A coupling sleeve 26 is provided having at its opposite ends with two identical interior threads, one of which meshes with the thread 24 of the spindle 2, and in the other use of which the exterior thread of a drill bit 9 is introduced. Midway intermediate these threads of the sleeve 26 the latter is provided in its inner circumferential surface with a circumferential groove 27 in which the braking ring 6 is lodged. The spindle 2 and the drill bit 9 each have a projection 8 corresponding to the projection 8 of FIG. 1, and these projections each extend partly into the braking ring 6 in frictional engagement therewith. In this embodiment the spindle is not protected against entry of contaminants into its thread 24.

Figure 9:
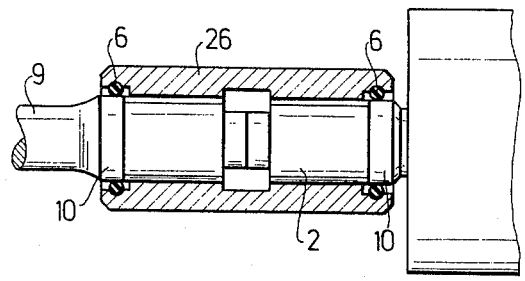
FIG. 9 is a side view, partly sectioned, of a ninth embodiment of the invention.

Such protection does, however, exist in the embodiment of FIG. 9 which is analogous to that of FIG. 8 except that in place of a single braking ring 6, two of these braking rings are provided. These rings 6 are located in FIG. 9 at the opposite axial end of the sleeve 26, outwardly adjacent the thread of the spindle 2 and of the drill bit 10, respectively. The spindle 2 and the drill bit 9 are each provided with a cylindrical portion 10 the exterior surface of which is engaged by these respective braking rings 6 which are each lodged in an inner circumferential grove of the sleeve 26. Thus, entry of contaminants into the thread 24 of the spindle 2 is reliably prevented.

Figure 10:
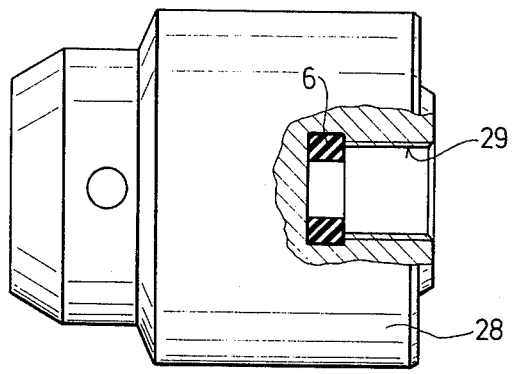
FIG. 10 is a side view, partly sectioned, of a tenth embodiment of the invention.

In the embodiment of FIG. 10 a chuck 28 is provided, having a bore provided with an inner thread 29, and the braking ring 6 is lodged in a circumferential groove formed in the bore inwardly adjacent the thread 29. The spindle 2 has not been shown in this embodiment but it will be appreciated that the chuck 28 of FIG. 10 can be threaded directly onto the spindle 2 in lieu of the sleeve 26 shown in FIG. 8. This is an arrangement in which any conventional drill bit can be readily connected with the drive unit via the chuck 28. However, it will be appreciated that the thread 29 is not protected against the entry of contaminants in this embodiment.

Figure 11:
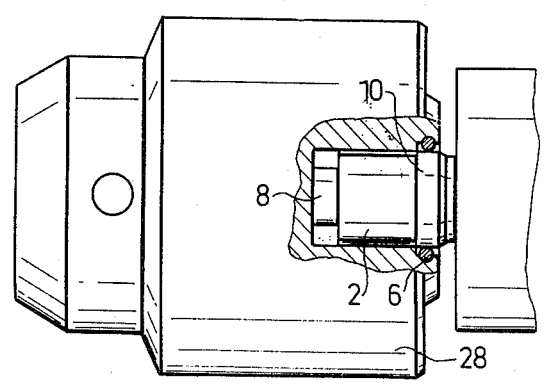
FIG. 11 is a view similar to FIG. 10 illustrating an eleventh embodiment of the invention.

Such protection is afforded in the embodiment of FIG. 11. This embodiment is largely the same as that of FIG. 10 except that the braking ring 6 is here lodged in an inner circumferential recess which is formed adjacent the outer end of the thread 29 and in which the braking ring 6 is located. The braking ring in this embodiment engages an cylindrical portion 10 formed on the spindle 2 and of course seals the thread 29 against the entry of contaminants. In this embodiment the ring 6 can of course very readily be inspected for wear and replaced if necessary.

Figure 12:
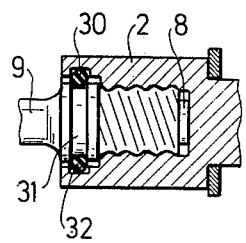
FIG. 12 is a fragmentary sectional detail view illustrating a twelfth embodiment of the invention.

Coming to the embodiment of FIG. 12, finally, it will be seen that this illustrates a possibility of using a braking ring which is a spring ring rather than being of soft elastic material having a high coefficient of friction with respect to steel. The spring ring is designated in FIG. 12 with reference numeral 30 and engages into a circumferential groove 31 when the two components to be threaded together, that is in this embodiment the sleeve 2 and the drill bit 9, are completely threaded one into the other. The ring 30 is loosely received in an inner circumferential groove 32 which permits it to turn but prevents it from performing axial movements. The ring 30 may be of steel or another springy hard material. If steel is used then the ring 30 advantageously is configured as a spiral spring or as a spring ring configurated analogously to a circlip, that is a ring which has a short interruption at one location in its circumference.

The embodiment of FIG. 12 has the advantage that the wear of the ring 30 will be very low. On the other hand of course the thread of the spindle 2 is no longer protected against entry of contaminants. Also, the type of ring used in the embodiment of FIG. 12 will not have the noise-damping properties of the braking ring 6 in the preceeding embodiments.

It remains to be pointed out that the type of ring shown in the embodiment of FIG. 12, and the manner in which it is arranged, can be used in the preceding embodiments also, in lieu of the braking rings 6 shown therein.

It will be understood that each of the elements described above, or two or more together, may also find a useful application in other types of constructions differing from the types described above.

While the invention has been illustrated and described as embodied in a drill mount for connecting a drill bit to a drive unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a drill mount for connecting a drill bit to a drive unit, a combination comprising a rotary steel spindle member having a free end portion; an auxiliary steel member having a portion provided with a first thread; a second thread formed on said free end portion which is threadedly connected with said first thread, said second thread having an angle of rise the tangent of which is at least equal to the coefficient of static friction of steel on steel, whereby said members can be disengaged without requiring significant force; and braking means co-acting with said spindle and auxiliary members for providing a frictional braking action between said members which suffices to prevent their loosening during operation.

2. In a drill mount for connecting a drill bit to a drive unit, a combination comprising a rotary steel spindle member having a free end portion; an auxiliary steel member having a portion provided with a first thread; a second thread formed on said free end portion which is threadedly connected with said first thread, said second thread having an angle of rise the tangent of which is at least equal to the coefficient of static fraction of steel on steel, whereby said members can be disengaged without requiring significant force; and a braking ring of elastic material provided on said spindle member and co-acting with said auxiliary member for providing a frictional braking action between said members which suffices to prevent the loosening of said members during operation without requiring significant force to disengage said members.

3. A combination as defined in claim 2, wherein said braking ring is fixedly connected with one of said members and has a first diameter; and wherein the other of said members has a second diameter which differs from said first diameter.

4. A combination as defined in claim 3, wherein said auxiliary member further has a cylindrical shoulder portion, and wherein said braking ring acts frictionally with said cylindrical shoulder portion and a part of said second thread.

5. A combination as defined in claim 3, wherein the frictional braking action of said ring suffices for transmitting substantially 20 Nm of torque.

6. A combination as defined in claim 5, wherein the frictional braking action of said ring is effective only over the length of approximately 0.5 – 1.5 turns during the threading together of said members.

7. A combination as defined in claim 2, wherein said braking ring co-acts frictionally with said second thread.

8. A combination as defined in claim 2, wherein said second thread is an internal thread and said spindle member comprises a circumferential groove; and wherein said ring is lodged in and retained by said groove.

9. A combination as defined in claim 8, wherein said groove is an inner groove.

10. A combination as defined in claim 8, wherein said ring is outwardly adjacent said second thread; and wherein said auxiliary member has a shoulder which is engaged by said ring and which has a diameter greater than threads provided on said auxiliary member for mating with said second thread of said spindle.

11. A combination as defined in claim 8, wherein said ring is inwardly adjacent said second thread; and wherein said auxiliary member has a cylindrical threaded portion adjacent said first thread of said auxiliary member and frictionally engaged by said ring.

12. A combination as defined in claim 8, wherein said spindle member has a outer circumferential groove, and said auxiliary member has a shoulder; and wherein said ring is lodged in said groove and in frictional engagement with said shoulder.

13. A combination as defined in claim 8, and wherein said auxiliary member has a outer circumferential groove in which said ring is lodged.

14. A combination as defined in claim 2, wherein said auxiliary member is an elongated drill bit.

15. A combination as defined in claim 2, wherein said auxiliary member is a pin having one end provided with said first thread, and another end provided with a chuck.

16. A combination as defined in claim 15, wherein said pin and said chuck are non-releasably connected.

17. A combination as defined in claim 2, wherein said auxiliary member is a pin having two ends each provided with first threads for connection with said spindle member and a chuck respectively.

18. A combination as defined in claim 2, wherein said second thread is an external thread and said spindle member includes a shoulder for limiting the extent to which said spindle member can be threaded into said auxiliary member.

19. A combination as defined in claim 18; and further comprising a coupling sleeve having two identical internal first threads one of which is adapted to mate with said second thread of said spindle member.

20. a combination as defined in claim 19, wherein said ring is lodged in an inner circumferential groove between said first threads of said sleeve, and is in frictional contact with shoulders on said spindle member and said auxiliary member.

21. A combination as defined in claim 19, wherein said sleeve has an inner circumferential groove; said ring being lodged in said groove and having frictional contact with a shoulder on at least one of said members.

22. A combination as defined in claim 19, said sleeve having an outer circumferential groove adjacent each end respectively; and said ring being lodged in said groove and in frictional engagement with shoulders on said spindle member and said auxiliary member.

23. A combination as defined in claim 18; and further comprising a chuck having a recess provided with an inner first thread adapted to mesh with said second thread of said spindle member, and with an inner circumferential groove in which said ring is lodged.

24. A combination as defined in claim 2, wherein one of said spindle members and auxiliary members has a circumferential groove; and wherein said ring is a spring ring which engages in said groove.

25. In a drill mount for connecting a drill bit to a drive unit, a combination comprising a rotary steel spindle member having a free end portion; an auxiliary steel member having a portion provided with a first thread and a cylindrical shoulder portion; a second thread formed on said free end portion which is threadedly connected with said first thread, said second thread having an angle of rise the tangent of which is at least equal to the coefficient of static friction of steel on steel; and a braking ring of elastic material provided on said spindle member and co-acting frictionally with said cylindrical shoulder portion of said auxiliary member for providing a frictional braking action between said members which suffices to prevent the loosening of said members during operation without requiring significant force to disengage said members.

* * * * *